J. R. WEATHERLY.
STALK CUTTER.
APPLICATION FILED JAN. 28, 1909.

939,573.

Patented Nov. 9, 1909.
2 SHEETS—SHEET 1.

Witnesses

Inventor
John R. Weatherly.
By
Attorneys

J. R. WEATHERLY.
STALK CUTTER.
APPLICATION FILED JAN. 28, 1909.
939,573.
Patented Nov. 9, 1909.
2 SHEETS—SHEET 2.
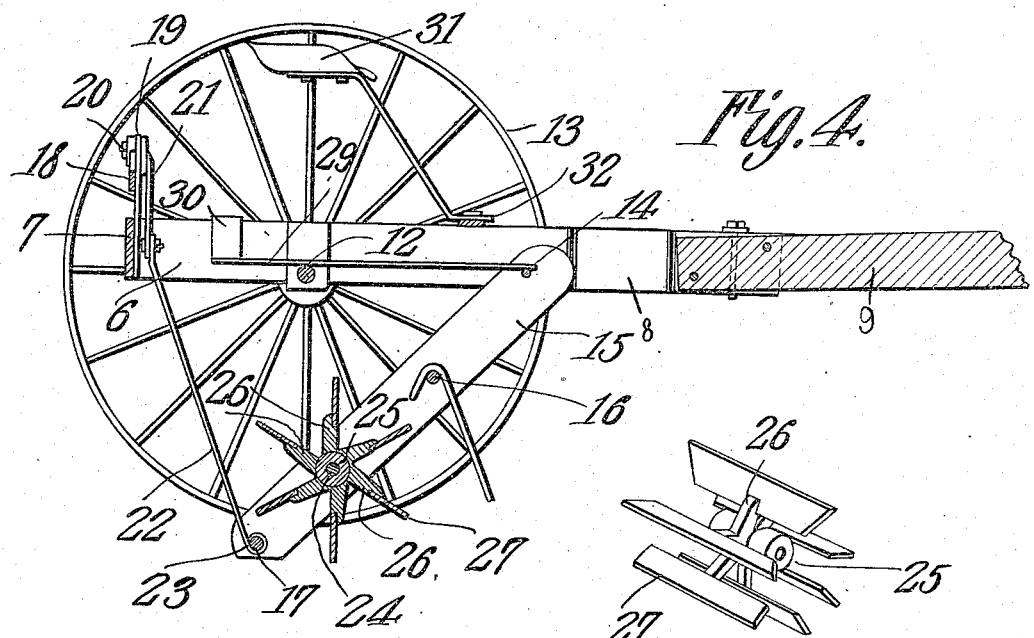
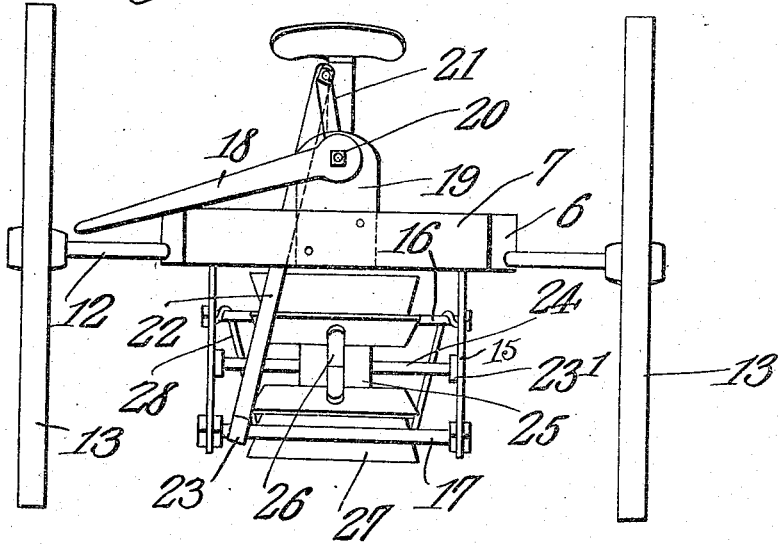
Witnesses
Inventor
John R. Weatherly.
By C. A. Snow & Co.
Attorneys

UNITED STATES PATENT OFFICE.

JOHN R. WEATHERLY, OF ATLANTA, GEORGIA.

STALK-CUTTER.

939,573.  Specification of Letters Patent.  Patented Nov. 9, 1909.

Application filed January 28, 1909. Serial No. 474,647.

*To all whom it may concern:*

Be it known that I, JOHN R. WEATHERLY, a citizen of the United States, residing at Atlanta, in the county of Fulton and State of Georgia, have invented a new and useful Stalk-Cutter, of which the following is a specification.

This invention relates to stalk cutters, and more particularly to that class in which the stalk cutting devices are mounted in a frame supported at one end and adapted to have its other end raised or lowered, and one of the novel features of the present invention resides in the construction and arrangement of the lever in which is embodied the means for raising and lowering the frame. This lever is so pivoted and connected with the frame that when swung in either direction past the center of gravity, the frame will be rigidly supported in raised or in lowered position. As is customary in machines of this class, I have mounted the frame mentioned above in a main frame, and when the frame carrying the stalk-cutting devices is in raised or in lowered position, the lever for raising and lowering the frame lies in engagement with one or the other of the side bars of the main frame.

Figure 1:
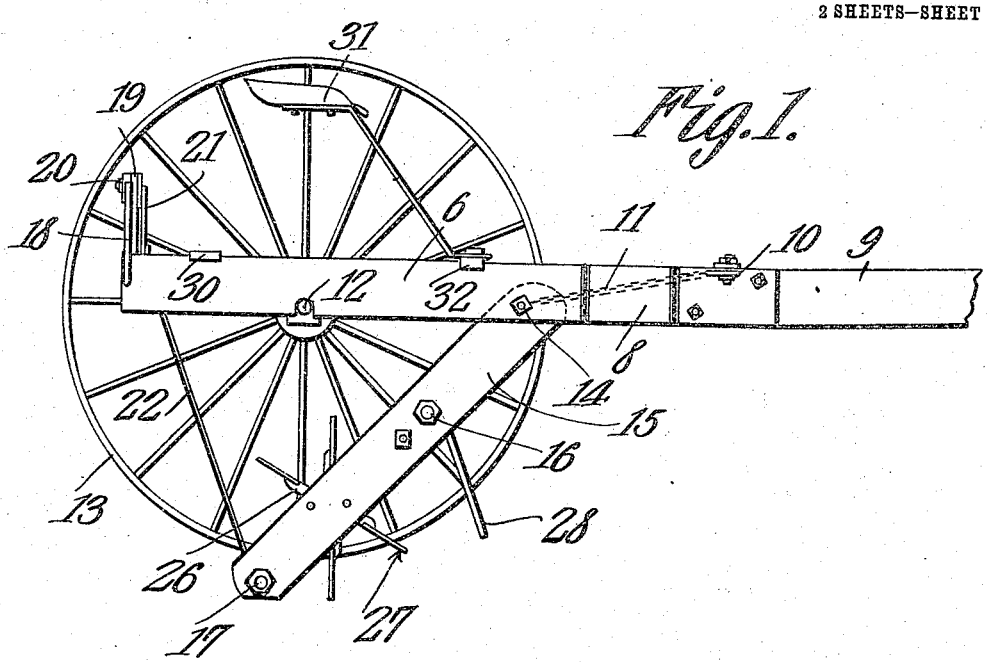
Figure 2:
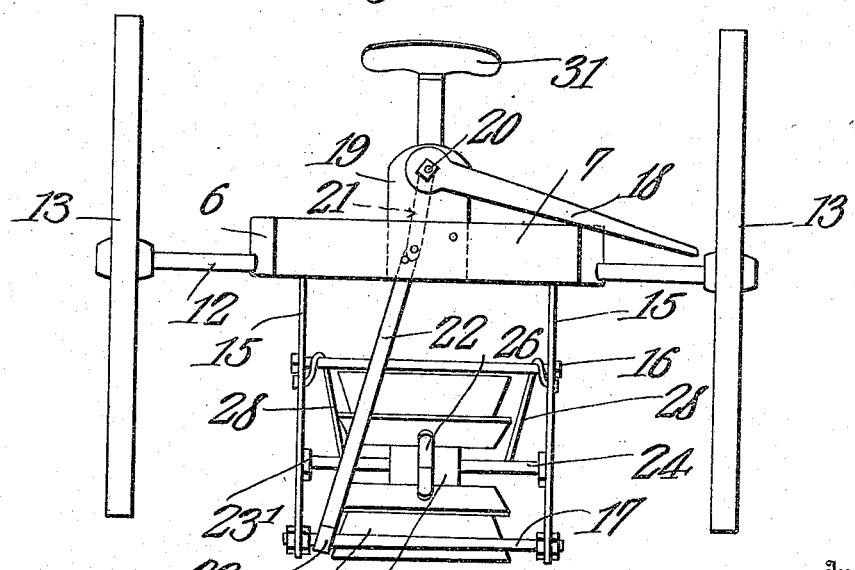

In the accompanying drawings:—Figure 1 is a side elevation of a stalk-cutter constructed in accordance with my invention. Fig. 2 is a rear elevation thereof, the frame in which the cutting devices are mounted being shown in lowered or operative position. Fig. 3 is a view similar to Fig. 2, but showing the cutting devices in raised or inoperative position. Fig. 4 is a vertical longitudinal sectional view of the machine, and Fig. 5 is a detail perspective view of the cutting mechanism of the machine, comprising the hub, the spider arms, and the blades.

As shown in the drawings, the machine embodying my invention is comprised, broadly speaking, of a main frame or body, and a frame which is supported by the main frame, and on which the cutting devices are mounted. The main frame is comprised of side portions 6, which have their rear ends connected by an integral connecting portion 7, the forward end portions of the side members of the main frame converging, as indicated by the numeral 8, and having secured between them the end of a tongue 9, upon which suitable draft devices are mounted, the said devices consisting preferably of a double-tree 10, connected at its ends by means of chains 11 with the side members 6 of the main frame.

An axle 12 is mounted in the main frame of the machine, and upon the axle are journaled wheels 13, which serve to support the frame of the machine for travel from place to place, and aid in supporting it while in use.

A rod 14 extends transversely of the main frame of the machine and next the side members fixed thereon and pivotally connected at their upper ends to this rod are the side members or bars 15 of the frame in which the cutting devices are mounted. The remainder of the said frame is comprised of a cross-bar 16 and a cross-bar 17, both of which connect the said side bars.

As will be readily understood, the frame just described is to be swung up and down upon the rod 14 as an axis, and, in order that it may be so raised and lowered, I have provided an operating mechanism which is embodied in a hand lever and connections between the said lever and the said frame. The lever mentioned above is indicated by the numeral 18 and is fixed upon a short shaft which is journaled in an upright plate or bearing 19, supported by the rear cross-bar 7 of the main frame, there being also fixed upon this short shaft, which is indicated by the numeral 20, a crank-arm 21, to the end of which is connected the upper end of a rod 22, provided in its lower end with an eye or bearing 23, through which the rod 17 of the cutter-supporting frame is loosely passed. As clearly shown in the drawings, and more particularly in Figs. 2 and 3 thereof, the crank-arm 21 extends substantially at right angles to the lever 18, and the pivot 20 of the lever is located above the plane of the main frame, so that when the lever is swung to the position shown in Fig. 2, to lower the cutter frame, in which position it rests upon the upper edge of the right-hand one of the side members 6 of the main frame, the crank-arm 21 extends to the left of a vertical line, passing through the pivot of the lever. When in this position, any strain or force exerted upon the cutter frame tending to raise it will act to more firmly bind the lever against the side member of the main frame, so that when lowered the cutter frame is rigid. On the other hand, when the lever 18 is swung to the position shown in Fig. 3 of the drawing, in which position it rests upon the upper edge of the left-hand side member of the main frame, the crank-arm 21 extends upwardly and to the left of the imaginary line drawn vertically through the pivot of the lever, the cutter frame being raised when the lever is in the position stated.

It will be understood, from an inspection of Fig. 3, that the cutter frame is rigidly supported in raised position, inasmuch as any tendency toward a downward swinging movement will exert a strain upon the lever 18, tending to force it more firmly against the side member of the main frame. It will thus be seen in connection with the means for raising and lowering the cutter frame of the machine embodying my invention, that the employment of a pawl and ratchet mechanism for holding the lever in its adjusted positions is obviated, and that a more secure and firmer structure is the result.

Suitable bearing boxes 23' are fixed one upon each of the side bars 15 of the cutter frame of the machine, and journaled within these bearing-boxes is a shaft 24, upon which is fixed a hub 25. The hub 25 is formed or provided midway of its ends with a plurality of radial arms 26, and bolted or otherwise secured to the extremity of each arm is a blade 27, the point of connection of the arms with the blades being preferably midway of the ends of the blades, so that the cutter mechanism will not become clogged with stalks being cut. As will be readily understood, the blades 27, when the cutter frame is lowered, dig into the soil, and cut and bury the loose stalks lying on the surface, and in order that the loose stalks may be more readily brought into position to be cut and buried by the blades, I have provided gatherer arms which are positioned in advance of the cutting mechanism, and which engage the stalks prior to their engagement by the knives 27. Each of the gatherer arms is in the form of a rod 28 which has its upper end secured to the adjacent one of the side members 15 of the cutter frame, and is bent to extend over the transverse rod 16, and thence in a downward direction. It will be understood that this manner of mounting the gatherer arms permits of yielding of the arms to a certain degree should they strike an obstruction such as a stone or stump, the arms serving to turn the stalks into the path of the machine and substantially in the line of travel of the machine, so that the blades when they act upon the stalks will be practically transverse thereof, thereby chopping the stalks into a number of short lengths and forcing the lengths partly beneath the surface of the soil.

A platform 29 is supported at the rear end by means of suitable brackets 30 which are secured to the side members 6 of the main frame and rests at its forward end upon the cross-bar 14, which supports the cutter frame, and a suitable seat 31 is mounted upon a cross-bar 32 secured at its end to the said side members 6 of the main frame.

Having described my invention, what I claim as new and desire to secure, by Letters Patent, is:—

In a machine of the class described, a main frame having side members, a frame mounted to be raised and lowered in the main frame, cutting devices arranged in the last mentioned frame, the main frame having a rear cross member, an upstanding bracket mounted upon the member, a crank arm disposed against the forward side of the said bracket and in a plane in front of the said rear cross member of the main frame, a lever having one end disposed against the rear face of the bracket, and in the plane of the said rear cross member, a bolt passed through the crank arm and lever, and relatively fixing the same and supporting the same for rocking movement, and a bar pivoted at its upper end to the extremity of the crank arm and extending downwardly and forwardly, and connected to the rear of the cutter frame.

In testimony that I claim the foregoing as my own, I have hereto affixed my signature in the presence of two witnesses.

JOHN R. WEATHERLY.

Witnesses:
Q. W. FULLER,
LEE ALLEN.